United States Patent
Kawasaki

(10) Patent No.: US 8,324,904 B2
(45) Date of Patent: Dec. 4, 2012

(54) COLD CATHODE IONIZATION VACUUM GAUGE, AUXILIARY DISCHARGE STARTING ELECTRODE, AND VACUUM PROCESSING APPARATUS

(75) Inventor: Yohsuke Kawasaki, Yamanashi (JP)

(73) Assignee: Canon Anelva Corporation, Kanagawa (JP)

( * ) Notice: Subject to any disclaimer, the term of this patent is extended or adjusted under 35 U.S.C. 154(b) by 389 days.

(21) Appl. No.: 12/786,364

(22) Filed: May 24, 2010

(65) Prior Publication Data
US 2010/0301869 A1    Dec. 2, 2010

(30) Foreign Application Priority Data
May 28, 2009    (JP) .................. 2009-128893

(51) Int. Cl.
*G01L 21/30*  (2006.01)
*G01L 21/34*  (2006.01)

(52) U.S. Cl. ........................ 324/460; 324/463

(58) Field of Classification Search ............ 324/460, 324/463
See application file for complete search history.

(56) References Cited

U.S. PATENT DOCUMENTS

| | | | |
|---|---|---|---|
| 5,157,333 A | 10/1992 | Peacock et al. | |
| 5,198,772 A | 3/1993 | Peacock et al. | |
| 5,767,629 A * | 6/1998 | Baptist | ............ 315/168 |
| 6,407,382 B1 * | 6/2002 | Spangler | ............ 250/286 |

FOREIGN PATENT DOCUMENTS

| | | |
|---|---|---|
| JP | 6-26967 | 2/1994 |
| JP | 10-19711 | 1/1998 |
| JP | 2008-304360 | 12/2008 |

* cited by examiner

*Primary Examiner* — Amy He
(74) *Attorney, Agent, or Firm* — Fitzpatrick, Cella, Harper & Scinto

(57) ABSTRACT

The present invention provides a cold cathode ionization vacuum gauge, an auxiliary discharge starting electrode plate, and a vacuum processing apparatus which have simple configurations and, even after long-term-use, which allow discharge to be initiated in a short-period of time and also to be performed stably after the start of the discharge. A cold cathode ionization vacuum gauge according to one embodiment of the present invention includes: an anode; a gauge head chamber (cathode) placed in such a manner as to form a discharge space together with the anode; and a protruding configured so that, in voltage-application to the anode and the cathode, an electric field should be concentrated at the protruding portion to a larger extent than an electric field at the gauge head chamber is. The protruding portion is provided inside the discharge space in such a manner that the protruding portion has a floating potential.

9 Claims, 8 Drawing Sheets

COLD CATHODE IONIZATION VACUUM GAUGE, AUXILIARY DISCHARGE STARTING ELECTRODE, AND VACUUM PROCESSING APPARATUS

CROSS-REFERENCES TO RELATED APPLICATIONS

This application claims the benefit of priority from Japanese Patent Application No. 2009-128893 filed May 28, 2009, the entire contents of which is incorporated herein by reference.

BACKGROUND OF THE INVENTION

1. Field of the Invention

The present invention relates to a cold cathode ionization vacuum gauge, a vacuum processing apparatus using the same, and an auxiliary discharge starting electrode plate, and particularly relates to an inverted magnetron cold cathode ionization vacuum gauge.

2. Description of the Related Art

A cold cathode ionization vacuum gauge measures a gas pressure by initiating ionization of the gas through self discharge of an anode and a cathode. Cold cathode ionization vacuum gauges of a penning type, a magnetron type, and an inverted magnetron type have been known as conventional cold cathode ionization vacuum gauges (see Japanese Patent Application Publication No. Hei 10-19711). In particular, the magnetron type and inverted magnetron type are suitable for high vacuum measurement because of their high electron trapping efficiencies as well as structures which allow stable sustained discharge even in a high vacuum area.

Meanwhile, to start discharge in a cold cathode ionization vacuum gauge, it is necessary to initiate ionization through high voltage application. There is, however, a time delay between when a high voltage is applied to the cold cathode ionization vacuum gauge and when a discharge current begins to flow upon start of sustained discharge. This time delay affects the time until the start of the measurement.

In this respect, Japanese Patent Application Publication No. Hei 06-26967 discloses an inverted magnetron type cold cathode ionization vacuum gauge aiming to shorten the discharge initiation time from application of a high voltage to start of sustained discharge. The inverted magnetron type cold cathode ionization vacuum gauge in Japanese Patent Application Publication No. Hei 06-26967 is one in which a cathode is provided with discharge initiating means for directly emitting electromagnetic radiation large enough to release photoelectrons from the cathode.

In addition, Japanese Patent Application Publication No. 2008-304360 aims to provide an auxiliary ignition device which allows an improvement in assemblability of the auxiliary ignition device to a vacuum gauge body. Specifically, disclosed is a cold cathode ionization vacuum gauge including: a base part having a through-hole which is formed therein and through which an electrode penetrates; and an auxiliary ignition member including a protruding portion which projects from an inner peripheral surface of the through-hole toward the electrode.

Meanwhile, the conventional cold cathode ionization vacuum gauge described in Japanese Patent Application Publication No. Hei 06-26967 leads to complexity of the apparatus because the gauge is provided separately with means, such as a glow lamp or a UV exposure lamp, as means for initiating discharge, and a circuit for such means. Additionally, since the cold cathode ionization vacuum gauge of magnetron or inverted magnetron type exhibits a high trapping effect of charged particles, a wall surface of a chamber of the vacuum gauge is likely to be sputtered. The inside of the chamber of the vacuum gauge is therefore contaminated in some cases.

Thus, long term use of the vacuum gauge leads to adhesion of a sputtered film and/or a product onto a lamp surface, which in turn hinders emission of ultraviolet light. This, as a result, reduces the amount of photoelectrons to be generated which trigger discharge, and thus causes a problem of making discharge initiation difficult.

Meanwhile, in a case of using a cold cathode ionization vacuum gauge having an auxiliary ignition device as in Japanese Patent Application Publication No. 2008-304360, a dark current sometimes flows, and/or fluctuations sometimes occur in a discharge current after discharge is started.

SUMMARY OF THE INVENTION

The present invention has an object to provide a cold cathode ionization vacuum gauge, an auxiliary discharge starting electrode plate, and a vacuum processing apparatus which do not lead to complexity of the apparatus and, even after long term use, which allow discharge to be initiated in a short period of time and also to be performed stably after the start of discharge.

In order to achieve the object, the present invention provides a cold cathode ionization vacuum gauge including: an anode; a cathode placed in such a manner as to form a discharge space together with the anode; and a member configured so that, in voltage application to the anode and the cathode, an electric field should be concentrated at the member to a larger extent than an electric field at the cathode is. The member is provided inside the discharge space in such a manner that the member is floated.

The present invention provides an auxiliary discharge starting electrode plate used in a cold cathode ionization vacuum gauge which includes: a rod-shaped electrode as one of an anode and a cathode; and a cylindrical electrode as the other one of the anode and the cathode, the cylindrical electrode being provided in such a manner as to surround the rod-shaped electrode, the auxiliary discharge starting electrode plate including: an opening for penetrating the rod-shaped electrode; a protrusion which is provided to the auxiliary discharge starting electrode plate while being insulated therefrom, and which projects in the opening; and a support claw for attachment to the cylindrical electrode.

The present invention makes it possible, without leading to complexity of the apparatus, to initiate discharge in a short period of time even when a sputtered film and/or a product is/are adhered to the inside of a gauge head of a vacuum gauge due to long term use. In addition, discharge can be performed stably after started.

DETAILED DESCRIPTION OF THE INVENTION

Embodiments of the present invention will be described below with reference to the drawings. The parts, arrangements, and so forth to be described below are simply exemplary implementations of the present invention and are not intended to limit the present invention. Various modifications and changes can be made based on the gist of the present invention, as a matter of course.

Figure 1:
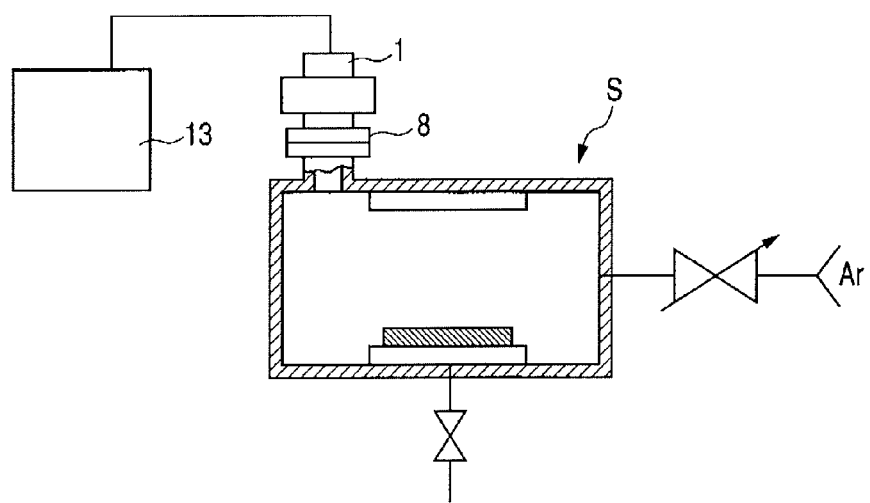
FIG. 1 is an outline view showing an embodiment of a cold cathode ionization vacuum gauge and of a vacuum processing apparatus provided with the gauge according to the present invention.
Figure 2:
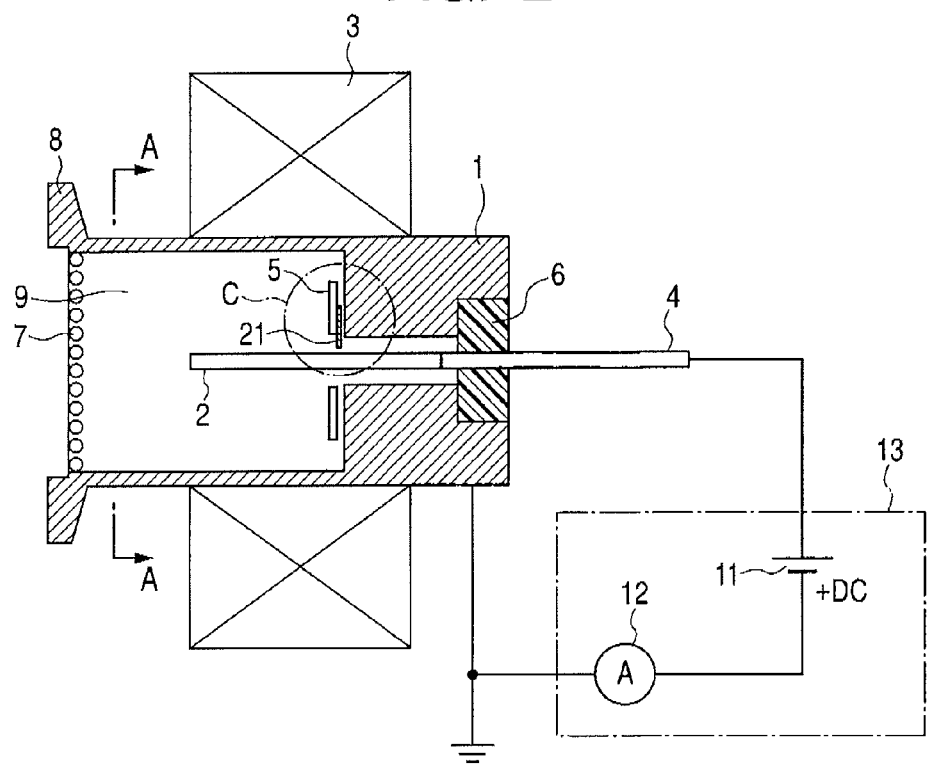
FIG. 2 is a schematic view of a transverse cross section showing an embodiment of the cold cathode ionization vacuum gauge according to the present invention.

FIG. 1 is an outline view of a cross section of a cold cathode ionization vacuum gauge and of a vacuum processing apparatus provided with the gauge according to the present invention. FIG. 2 is a schematic view of a transverse cross section of the cold cathode ionization vacuum gauge according to the present invention. As shown in FIG. 1, the cold cathode ionization vacuum gauge is attached to a wall surface of a known vacuum chamber constituting the vacuum processing apparatus S. Specifically, the cold cathode ionization vacuum gauge is attached to an opening portion in the wall surface of the vacuum chamber while maintaining the vacuum chamber hermetic. Reference numeral 1 represents a gauge head chamber (cathode) constituting the cold cathode ionization vacuum gauge; 8, a connector flange; and 13, a vacuum gauge operation circuit.

In the specification of the present application, a sputtering apparatus will be described as an example of the vacuum processing apparatus S, but the present invention is not limited to this. For example, the cold cathode ionization vacuum gauge of the present invention is suitably applicable to a film formation apparatus such as PVD apparatus or CVD apparatus, an ashing apparatus, a dry etching apparatus, and the like.

First Embodiment

The cold cathode ionization vacuum gauge shown in FIG. 2 is an inverted magnetron vacuum gauge, and includes a gauge head chamber (cathode) 1 as a cathode, which is a metal member having a substantially cylindrical or tubular shape, and a rod-shaped anode 2 which is surrounded by a tubular discharge space 9 formed inside the gauge head chamber 1. As magnetic means for generating a magnetic field, an annular magnet 3 is placed along an outer periphery of the gauge head chamber (cathode) 1 in such a manner as to surround the gauge head chamber 1. A ferrite magnet is preferably used for the magnet 3. As will be described later, an auxiliary discharge starting electrode plate 5 is detachably attached to the inside of the gauge head chamber (cathode) 1.

Inside the gauge head chamber (cathode) 1, the anode 2 is connected to a current introducing rod 4. The current introducing rod 4 is connected to a vacuum gauge operation circuit 13 via an insulating stone 6 such as alumina ceramics. The vacuum gauge operation circuit 13 includes a high voltage power supply 11 for applying a voltage, and a discharge current detector 12 for measuring a discharge current flowing in the vacuum gauge operation circuit 13.

A connector flange 8 and a filter 7 are provided to an opening side of the gauge head chamber (cathode) 1. The filter 7 is made of a stainless steel or the like. With the connector flange 8 attached to a measurement target body (for example, the vacuum processing apparatus S shown in FIG. 1), the gauge head chamber (cathode) 1 is capable of measuring the pressure inside an inner space in the measurement target body. At the time of pressure measurement, the filter 7 allows air to pass between the space in the measurement target body and the discharge space 9 formed inside the gauge head chamber (cathode) 1.

To the bottom of the discharge space 9, i.e., the side where the insulating stone 6 is placed, there is attached the auxiliary discharge starting electrode plate 5 having a disc shape. As will be described later in detail, the auxiliary discharge starting electrode plate 5 is detachably attached to the gauge head chamber (cathode) 1. Moreover, a protruding portion 21 is attached to the auxiliary discharge starting electrode plate 5 in such a manner as to project toward the anode 2. In this embodiment, the gauge head chamber 1 as the cathode and the anode 2 form the discharge space 9. Then, upon application of a voltage from the vacuum gauge operation circuit 13 to the anode 2, discharge occurs between the anode 2 and the gauge head chamber (cathode) 1, whereby plasma is generated in the discharge space 9. The auxiliary discharge starting electrode plate 5 is placed so as to start discharge easier. Specifically, providing the auxiliary discharge starting electrode plate 5 enables rapid discharge start. Hence, the auxiliary discharge starting electrode plate 5 can be placed at any position as long as it is inside the discharge space 9.

Figure 3:
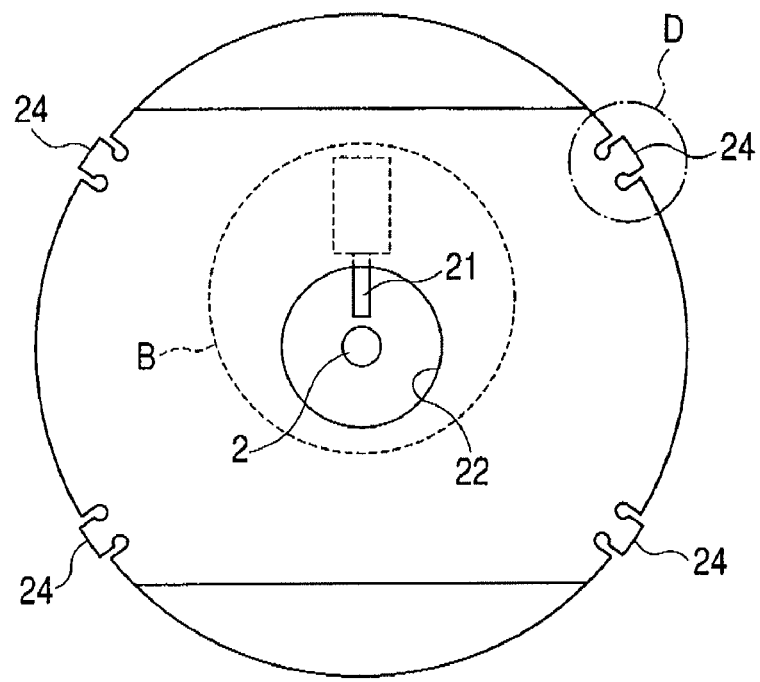
FIG. 3 is a schematic view showing a state of attachment of an auxiliary discharge starting electrode plate to the cold cathode ionization vacuum gauge shown in FIG. 2.
Figure 4:
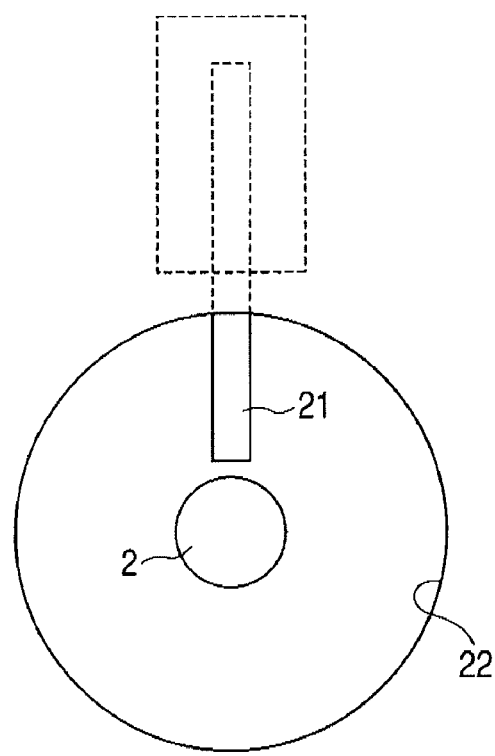
FIG. 4 is an enlarged view of a part B in FIG. 3.
Figure 5:
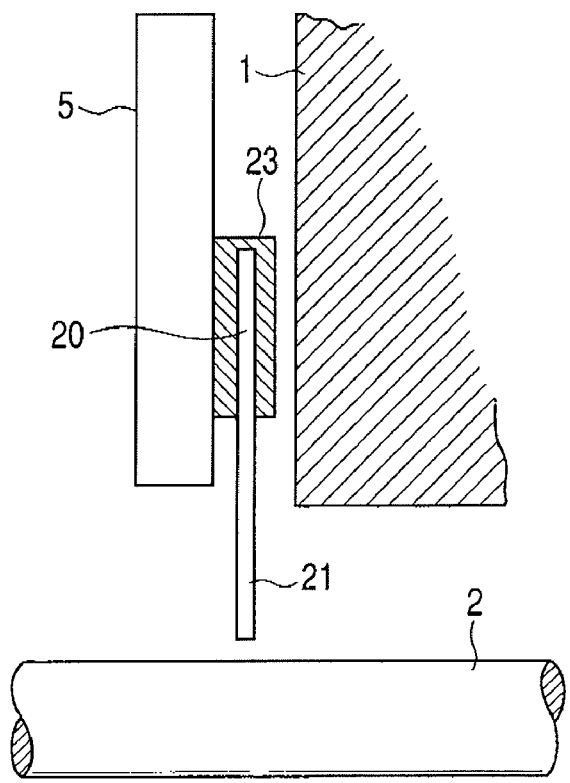
FIG. 5 is an enlarged view of a part C in FIG. 2.

FIG. 3 is a schematic view for showing an example of the state of attachment of the auxiliary discharge starting electrode plate 5 to the cold cathode ionization vacuum gauge according to this embodiment. Specifically, FIG. 3 is a schematic view of a cross section of the inside of the gauge head chamber (electrode) 1 of the cold cathode ionization vacuum gauge in FIG. 2, viewed from and taken along the A-A line. FIG. 4 is a schematic view showing a part B in FIG. 3 enlarged for illustrating the positional relationship between the auxiliary discharge starting electrode plate 5 and the anode 2. FIG. 5 is a detail view of a part C in FIG. 2.

As shown in FIG. 3, an opening 22 is provided in a center portion of the auxiliary discharge starting electrode plate 5. The protruding portion 21 is placed on the edge of the opening 22 in such a manner as to project toward the center of the opening 22. The auxiliary discharge starting electrode plate 5 is placed inside the gauge head chamber (cathode) 1 in such a manner that the tip of the protruding portion 21 is located close to but not in contact with the anode 2. The distance between the tip of the protruding portion 21 and the anode 2 is preferably within a range of not smaller than 0.05 mm but not larger than 3.0 mm, in order to suppress fluctuations in discharge current and to maintain a dark current at a lower measurement limit or lower. Note that the distance between the tip of the protruding portion 21 and the anode 2 means the shortest distance between the tip of the protruding portion 21 and the anode 2.

By attaching the auxiliary discharge starting electrode plate 5 with the protruding portion 21 to the gauge head chamber (cathode) 1, electrons are drawn out of the protruding portion 21 due to field emission when a high voltage is applied to the anode 2. In this event, the distance between the protruding portion 21 and the anode 2 is the closest compared to any other locations, and the tip of the protruding portion 21 has such a shape that causes electric field concentration most likely compared to any other locations. Thus, at the moment of turning on the high voltage power supply 11, the threshold of the field electron emission at the tip of the protruding portion 21 drops. Thereby, electrons as a trigger to start discharge can be supplied efficiently. This, as a result, makes it possible to shorten the time from the application of a high voltage between the gauge head chamber (cathode) 1 and the anode 2, until the start of sustained discharge.

The auxiliary discharge starting electrode plate 5 may be formed of a thin plate of a highly corrosion-resistant metal of, for example, a stainless steel such as SUS304, nickel, a high melting point material, or the like. The thickness of the auxiliary discharge starting electrode plate 5 is preferably not smaller than 0.1 mm but not larger than 1.0 mm. The protruding portion 21 is projecting as described above in the opening 22 of the auxiliary discharge starting electrode plate 5.

In an example in FIG. 5, the protruding portion 21 is a fibrous member 20, which is fixed to the auxiliary discharge starting electrode plate 5 with an insulating material 23 interposed in between. Here, the fibrous member refers to a member in a shape of a slender rod. An insulating adhesive such as a polyimide adhesive or an alumina adhesive is used for the insulating material 23. Meanwhile, with the insulating material 23, the fibrous member 20 forming the protruding portion 21 is attached to the auxiliary discharge starting electrode plate 5 while being insulated therefrom. Thus, the protruding portion 21 has a floating potential. As described above, in this embodiment, the protruding portion 21 (fibrous member 20) is connected to the auxiliary discharge starting electrode plate 5 while being insulated therefrom.

By setting the protruding portion 21 to have a floating potential, only the electrons charged to the protruding portion 21 are emitted at start of discharge, and electrons are not kept being supplied from the protruding portion 21 constantly. Accordingly, it is possible to suppress a dark current and fluctuations in discharge current after start of sustained discharge which are attributable to the protruding portion 21. Incidentally, after the discharge stops, followed by application of another high voltage to the anode 2, the protruding portion 21 is charged as soon as the high voltage is applied. This enables rapid emission of the electrons charged to the protruding portion 21, even when a high voltage is applied again to the anode 2.

In the actual measurement, discharge is caused in the discharge space 9 by applying a voltage from the high voltage power supply 11 to the gauge head chamber 1 as the cathode and the anode 2. Then, based on the current value detected by the discharge current detector 12 during the discharge (during sustained discharge), the pressure inside the vacuum processing apparatus S is measured. In this embodiment, the structure is such that the protruding portion 21 is formed in a thin shape and thus the electric field is concentrated at the protruding portion 21. This allows local electric field concentration inside the discharge space 9. Accordingly, upon application of a voltage to the gauge head chamber 1 and the anode 2, the electrons charged to the protruding portion 21 are emitted. In this way, discharge can be initiated in a shorter period of time than in a case without the protruding portion 21.

Further, in this embodiment, the protruding portion 21 is connected to the auxiliary discharge starting electrode plate 5 via the insulating material 23, and thus the protruding portion 21 has a floating potential. This leads to electrical isolation of the protruding portion 21 from the gauge head chamber (cathode) 1 and the anode 2 during measurement (during sustained discharge). Accordingly, during sustained discharge, i.e., during measurement, no electrons are emitted from the protruding portion 21, or emission of the electrons is reduced. In this way, a dark current generated by the protruding portion 21 can be reduced. In addition, during sustained discharge, i.e., during measurement, the protruding portion 21 is substantially isolated from the member for generating discharge. This eliminates a cause of fluctuations in discharge current, the fluctuations being attributable to the protruding portion 21.

In contrast, in Japanese Patent Publication No. 2008-304360, a protruding portion provided with an auxiliary ignition device is electrically connected to a cathode, and therefore discharge can be initiated quickly. However, this protruding portion functions as a member for generating discharge even during sustained discharge. Hence, in the case of Japanese Patent Publication No. 2008-304360, electrons are emitted from the protruding portion even during sustained discharge, and these electrons end up with a dark current. Additionally, since electrons actively flow into the protruding portion, which is connected to the cathode as described above, this may be cause variations in discharge current. On the other hand, in this embodiment, the protruding portion 21 is provided in such a manner that the protruding portion 21 has a floating potential, generation of a dark current and variations in discharge current due to the protruding portion 21 can be reduced as mentioned above.

The fibrous member 20 can be obtained by cutting, in an appropriate length, a wire made of a high melting point material such as tungsten, iridium or platinum which is highly corrosion-resistant, or the like. The thickness of the fibrous member 20 is desirably 1 mm or less, in consideration of influence on the sensitivity of the vacuum gauge when the protruding portion 21 is placed over the opening 22 in the auxiliary discharge starting electrode plate 5. Here, the thickness of the protruding portion 21 is the mean diameter of the protruding portion 21. It should be noted that the whole point of providing the protruding portion 21 in this embodiment is to cause local electric field concentration inside the discharge space 9 formed by the anode 2 and the gauge head chamber 1, so that discharge can be started in a short period of time without bringing the anode 2 close to the gauge head chamber 1 as the cathode, or without applying a high voltage to the anode 2. Therefore, what kind of shape the protruding portion 21 should be formed into is not the whole point. Rather, the whole point is to structure the protruding portion 21 in such a way that the electric field is concentrated at the protruding portion 21 in a discharge space formed by an anode and a cathode having predetermined structures. Thus, the protruding member 21 is not limited to the above-described fibrous member (for example, a thin columnar member) as long as it can achieve a structure where the electric field is concentrated at the protruding portion 21 to a larger extent, in voltage application to the gauge head chamber 1 as the cathode and the anode 2, than the electric field at the cathode (gauge head chamber 1) is. For example, the protruding portion 21 may be formed into any shape, such as a tapered shape or a plate shape. Further, multiple protruding portions may be provided. Furthermore, as mentioned above, in consideration of the function of quick discharge start, it is needless to say that the protruding portion 21 can be placed anywhere as long as it is inside the discharge space 9.

As shown in FIG. 3, a support claw 24 for attachment to the gauge head chamber (electrode) 1 is formed in the auxiliary discharge starting electrode plate 5. The support claw 24 is provided in plurality in an outer circumference of the auxiliary discharge starting electrode plate 5.

The auxiliary discharge starting electrode plate 5 is formed by photo etching, press working, laser machining, etc.

Figure 6:
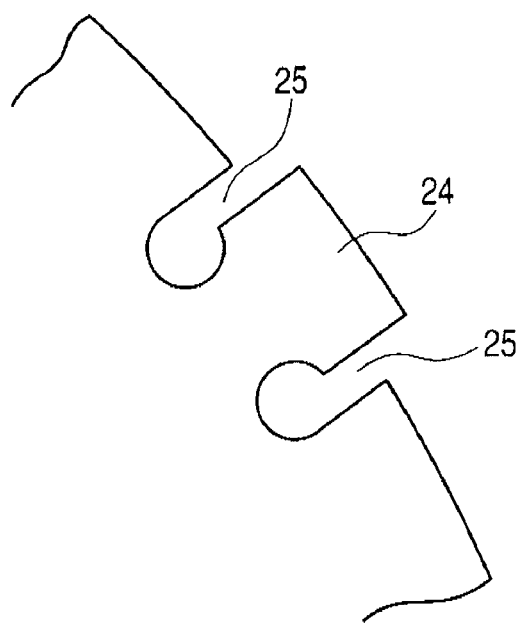
FIG. 6 is an enlarged view of a part D in FIG. 3.

Next, a method of attaching the auxiliary discharge starting electrode plate 5 to the gauge head chamber (electrode) 1 will be described by using FIGS. 2, 3, and 6. FIG. 6 is a schematic view for showing one form of the support claw 24, and is an enlarged view of a part D in FIG. 3.

The support claw 24 is formed in plurality in the outer circumference of the auxiliary discharge starting electrode plate 5 in such a manner as to project slightly from the outer circumference. Moreover, cuts 25 are formed on both side of each support claw 24 so as to form the claw 24 as shown in FIG. 6. To attach the auxiliary discharge starting electrode plate 5 to the inside of the gauge head chamber (cathode) 1, the auxiliary discharge starting electrode plate 5 is inserted from the opening portion into the gauge head chamber (cathode) 1 with the filter 7 detached. In this case, the insertion is performed with the support claws 24 bent toward the opening portion of the gauge head chamber (cathode) 1.

The auxiliary discharge starting electrode plate 5 is inserted to the bottom of the discharge space 9 (to the placement position of the auxiliary discharge starting electrode plate 5) while allowing the support claws 24 to press against the inner wall of the gauge head chamber (cathode) 1 in the discharge space 9 formed inside the gauge head chamber (cathode) 1. The bent support claws 24 exert pressing forces against the inner wall in the discharge space 9 due to their plate-spring-like actions. This permits the auxiliary discharge starting electrode plate 5 to be stably fixed on an inner side of the gauge head chamber (electrode) 1. The filter 7 is mounted last.

To remove the auxiliary discharge starting electrode plate 5 placed in the gauge head chamber (electrode) 1, the support claws 24 of the auxiliary discharge starting electrode plate 5 are raised inward by using a common tool such as pliers or tweezers, and then the auxiliary discharge starting electrode plate 5 is taken out. By forming the support claws 24 in the auxiliary discharge starting electrode plate 5 as above, it is possible to detachably attach the auxiliary discharge starting electrode plate 5 to the inside of the gauge head chamber (cathode) 1.

Note that although the auxiliary discharge starting electrode plate 5 is attached in contact with the bottom of the discharge space 9 formed inside the gauge head chamber (cathode) 1, the placement position of the auxiliary discharge starting electrode plate 5 is not limited to this. For example, the auxiliary discharge starting electrode plate 5 may be placed at a predetermined position in an area in the discharge space 9 where there exist a wall surface and the anode 2. In this embodiment, the discharge space 9 is formed by the gauge head chamber 1 as the cathode and the anode 2. Then, upon application of a voltage from the vacuum gauge operation circuit 13 to the anode 2, a discharge occurs between the anode 2 and the gauge head chamber (cathode) 1, whereby plasma is generated in the discharge space 9. The auxiliary discharge starting electrode plate 5 is placed so as to start discharge easier. Specifically, providing the auxiliary discharge starting electrode plate 5 enables rapid discharge start. Hence, the auxiliary discharge starting electrode plate 5 can be placed at any position as long as it is inside the discharge space 9.

Meanwhile, in this embodiment, the protruding portion 21 is formed by attaching the fibrous member 20 to the auxiliary discharge starting electrode plate 5 with the insulating material 23 interposed in between. Instead, the protruding portion 21 may be formed of an insulating material such as alumina. In other words, in this embodiment, any material can be used for the protruding portion 21 regardless of whether they are a conductor, semiconductor, or insulator, as long as they are capable of emitting electrons upon voltage application from the high voltage power supply 11.

According to the cold cathode ionization vacuum gauge of this embodiment, the auxiliary discharge starting electrode plate 5 with the protruding portion 21 is attached to the gauge head chamber (cathode) 1, and thus discharge can be initiated in a short period of time. Also, the auxiliary discharge starting electrode plate 5 is detachably attached to the cold cathode ionization vacuum gauge. Thus, if discharge becomes difficult to initiate due to deterioration of the auxiliary discharge starting electrode plate 5 as well as the protruding portion 21, such difficult discharge condition can be resolved by replacing the auxiliary discharge starting electrode plate 5 with a new one. Specifically, in this embodiment, the auxiliary discharge starting electrode plate 5, on which the protruding portion 21 is formed independently of the cathode and anode, is detachably provided. Thereby, no auxiliary ignition device needs to be installed in the vacuum gauge as in the case of Japanese Patent Publication No. 2008-304360, and this embodiment can be applied to existing cold cathode ionization vacuum gauges without having to change their machine configurations.

It is needless to say that the attachment of the auxiliary discharge starting electrode plate 5 is not limited to the detachable attachment. The auxiliary discharge starting electrode plate 5 may be fixed to the inside of the gauge head chamber 1.

Second Embodiment

Figure 7A:
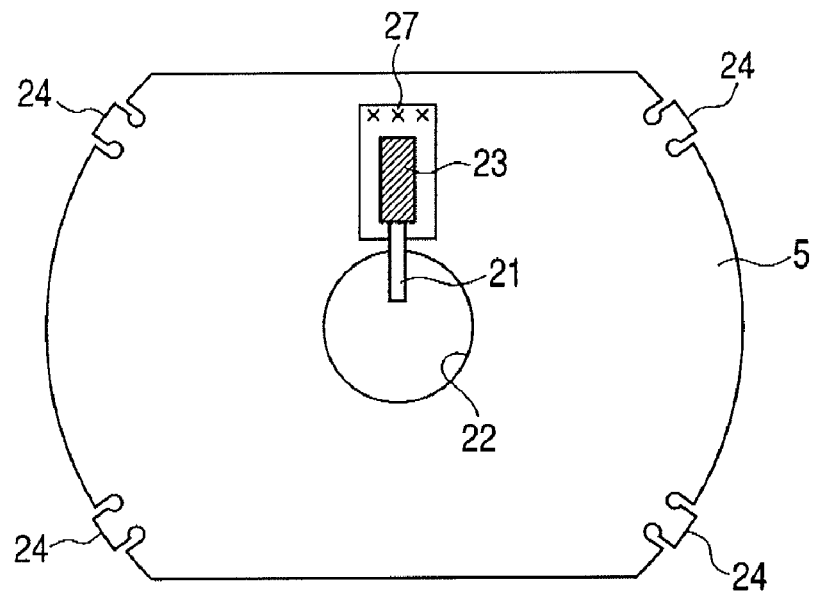
FIG. 7A is a plan view showing a modification of the auxiliary discharge starting electrode plate according to the present invention.
Figure 7B:
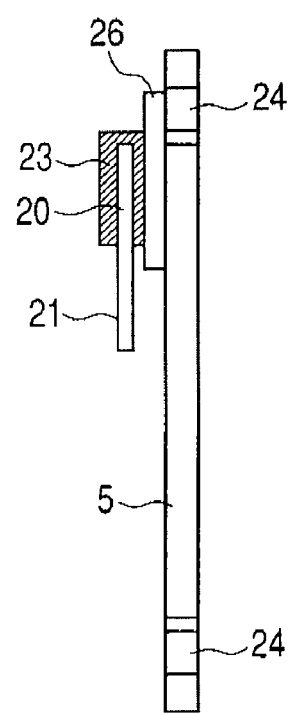
FIG. 7B is a side view of the auxiliary discharge starting electrode plate shown in FIG. 7A.

FIG. 7A is a plan view showing a modification of the auxiliary discharge starting electrode plate according to the present invention, and FIG. 7B is a side view thereof. In FIGS. 7A and 7B, the same parts as those in FIGS. 3 to 5 are denoted by the same reference numerals. In this embodiment, a deformation absorbing plate 26 is attached the auxiliary discharge starting electrode plate 5 shown in FIGS. 2 to 5, and the fibrous member 20 is attached to this deformation absorbing plate 26 with the insulating material 23 interposed in between. An insulating adhesive such as a polyimide adhesive or an alumina adhesive is used for the insulating material 23 as mentioned above. Meanwhile, examples of the material of the deformation absorbing plate 26 include highly corrosion-resistant metals of, e.g., a stainless steel such as SUS304, nickel, a high melting point material, and the like.

In this embodiment, the insulating adhesive is applied to the deformation absorbing plate 26 provided to the auxiliary discharge starting electrode plate 5, instead of applying the insulating adhesive directly to the auxiliary discharge starting electrode plate 5. The fibrous member 20 forming the protruding portion 21 is attached to the auxiliary discharge starting electrode plate 5 with the deformation absorbing plate 26 interposed in between. One side of the deformation absorbing plate 26 is fixed to the auxiliary discharge starting electrode plate 5 whereas the other side is left free. Joining portions 27 indicated by X marks in FIG. 7A represent positions where the deformation absorbing plate 26 is joined to the auxiliary discharge starting electrode plate 5. Note that the deformation absorbing plate can be attached to the auxiliary discharge starting electrode plate by spot welding or the like.

Meanwhile, the insulating material 23 may sometimes separate from the auxiliary discharge starting electrode plate 5 due to deformation of the auxiliary discharge starting electrode plate 5 at the time of placing the auxiliary discharge starting electrode plate 5 in the inner space of the gauge head chamber (cathode) 1. In this embodiment, however, the insulating material 23 and the fibrous member 20 are fixed to the auxiliary discharge starting electrode plate 5 with the deformation absorbing plate 26 interposed in between, and therefore deformation of the auxiliary discharge starting electrode plate 5 caused in attachment/detachment of the auxiliary discharge starting electrode plate 5 is released by the deformation absorbing plate 26. Accordingly, it is possible to solve the problem of the separation of the insulating material 23 in attachment/detachment of the auxiliary discharge starting electrode plate 5.

Third Embodiment

Figure 8A:
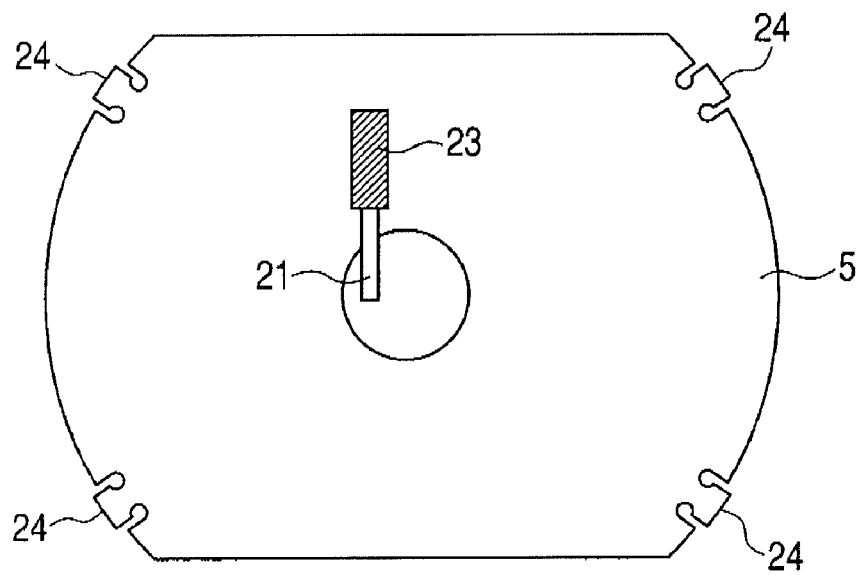
FIG. 8A is a plan view showing another modification of the auxiliary discharge starting electrode plate according to the present invention.
Figure 8B:
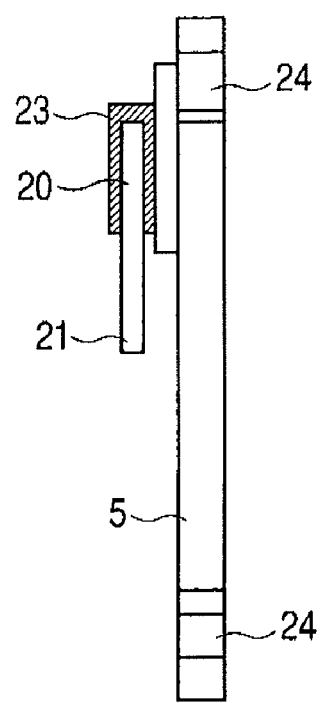
FIG. 8B is a side view of the auxiliary discharge starting electrode plate shown in FIG. 8A.

FIG. 8A is a plan view showing another modification of the auxiliary discharge starting electrode plate according to the present invention, and FIG. 8B is a side view thereof. In FIGS. 8A and 8B, the same parts as those in FIGS. 6 to 7B and so forth are denoted by the same reference numerals. In this embodiment, the protruding portion 21 of the auxiliary discharge starting electrode plate 5 shown in FIGS. 8A and 8B is placed off the center of the auxiliary discharge starting electrode plate 5 and closely to the anode 2. In this embodiment as well, it is possible to achieve a similar effect to that when the protruding portion 21 faces the anode 2.

Fourth Embodiment

Figure 9A:
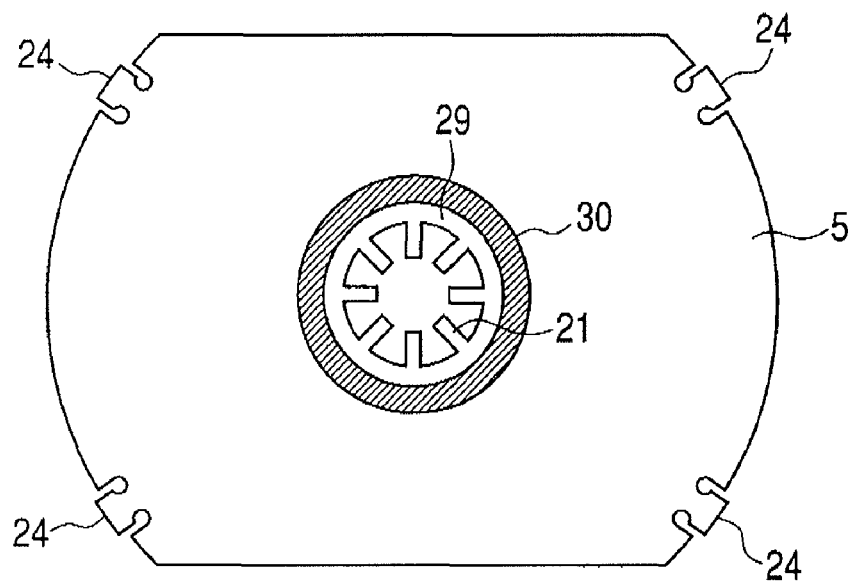
FIG. 9A is a plan view showing still another modification of the auxiliary discharge starting electrode plate according to the present invention.
Figure 9B:
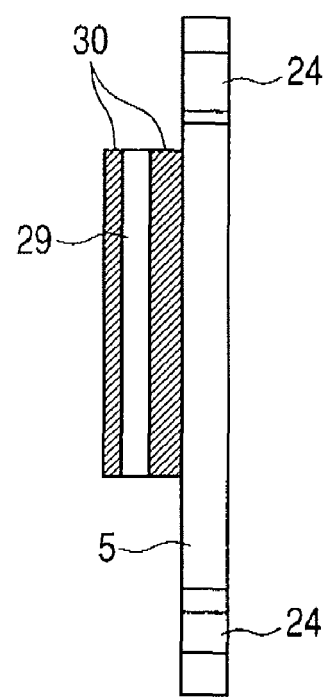
FIG. 9B is a side view of the auxiliary discharge starting electrode plate shown in FIG. 9A.

FIG. 9A is a plan view showing still another modification of the auxiliary discharge starting electrode plate according to the present invention, and FIG. 9B is a side view thereof. In FIGS. 9A and 9B, the same parts as those in FIGS. 6 to 8B and so forth are denoted by the same reference numerals. In this embodiment, as shown in FIGS. 9A and 9B, an annular plate-shaped member 29 including a plurality of the protruding portions 21 shown in FIG. 3 is fixed to the auxiliary discharge starting electrode plate 5 with an insulating material 30 interposed in between.

According to this embodiment, use of the plate-shaped member 29 having the multiple protruding portions 21 makes it more easier to initiate discharge, and also makes it possible to manufacture the multiple protruding portions 21 while managing the positional relationship among the protruding portions 21 in a fixed dimension and thereby suppresses the individual differences, to the minimum, with respect the inter-electrode distances between the protruding portions 21 and the anode 2. Hence, variations in performance among individual cold cathode ionization vacuum gauges can be suppressed. In the above case, a high melting point material such as tungsten, a highly corrosion-resistant metal such as Ni or Pt, or a general stainless steel can be used as the material of the plate-shaped member 29. The thickness of the plate-shaped member 29 is desirably 1 mm or less, in consideration of influence on the sensitivity of the vacuum gauge in a case of placing the plate-shaped member 29 over the opening 22 in the auxiliary discharge starting electrode plate 5. The plate-shaped member 29 is formed by photo etching, press working, laser machining, etc.

Fifth Embodiment

Figure 10A:
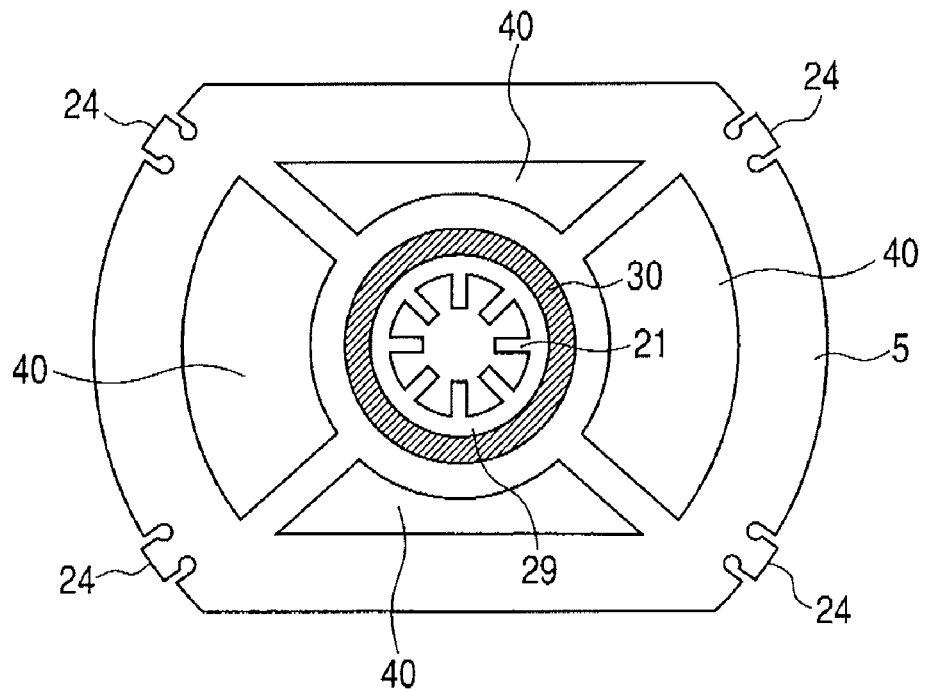
FIG. 10A is a plan view showing yet another modification of the auxiliary discharge starting electrode plate according to the present invention.
Figure 10B:
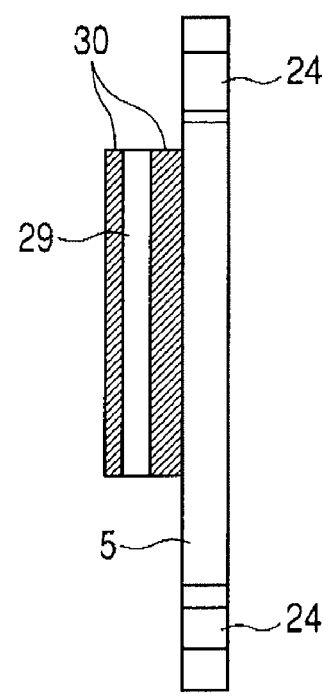
FIG. 10B is a side view of the auxiliary discharge starting electrode plate shown in FIG. 10A.

FIG. 10A is a plan view showing yet another modification of the auxiliary discharge starting electrode plate according to the present invention, and FIG. 10B is a side view thereof. In FIGS. 10A and 10B, the same parts as those in FIGS. 9A and 9B are denoted by the same reference numerals. In this embodiment, four opening portions 40 are additionally provided to the auxiliary discharge starting electrode plate shown in FIGS. 9A and 9B. Having many opening portions is a feature of the cold cathode ionization vacuum gauge of this embodiment. In a case where the auxiliary discharge starting electrode plate is provided to and brought into contact with the bottom of the discharge space formed inside the gauge head chamber (cathode) of the cold cathode ionization vacuum gauge, gas adsorbed to the bottom of the discharge space in the cold cathode ionization vacuum gauge can readily escape through the opening portions after vacuum measurement is started.

Sixth Embodiment

In the first to fifth embodiments, the auxiliary discharge starting electrode plate 5 with the protruding portions) 21 provided while being insulated therefrom is electrically connected to the cathode (gauge head chamber 1). However, the auxiliary discharge starting electrode plate 5 may be electrically connected to the anode.

For example, in the configuration shown in FIG. 2, the negative electrode of the high voltage power supply 11 may be electrically connected to the rod-shaped electrode indicated by the reference numeral 2, and the positive electrode of the high voltage power supply 11 may be electrically connected to the gauge head chamber 1. In this way, the cold cathode ionization vacuum gauge is configured such that the gauge head chamber 1 is the anode and the rod-shaped electrode 2 is the cathode. In this configuration too, the auxiliary discharge starting electrode plate 5 may be placed at a predetermined position inside the discharge space 9 as in the case of FIG. 2 and electrically connected to the gauge head chamber (which is the anode in this embodiment) 1. Then, obtained is a vacuum gauge in which the anode and the auxiliary discharge starting electrode plate 5 are electrically connected to each other.

Moreover, the auxiliary discharge starting electrode plate 5 with the protruding portion 21 provided while being insulated therefrom may be electrically connected to both the cathode and anode.

Seventh Embodiment

In the present invention, it is important that the protruding portion 21 has a floating potential. As one example to achieve a configuration therefor, the protruding portion 21 is provided to the auxiliary discharge starting electrode plate 5 with the insulating material 23 interposed in between. For this reason, the auxiliary discharge starting electrode plate 5 is one that functions as a support member for placing, inside the vacuum gauge, the protruding portion 21 to have a floating potential. Thus, as long as being capable of supporting the protruding portion 21, the auxiliary discharge starting electrode plate 5 does not necessarily have to be a conductor (electrode), and may be an insulator, semiconductor, or the like. When the support member to support the protruding portion 21 (corresponding to the auxiliary discharge starting electrode plate 5, for example) is an insulator, the protruding portion 21 can be insulated from each of the electrodes without using the insulating material 23.

In sum, what is important in the present invention is to start discharge in a short period of time and to suppress generation of a dark current and fluctuations in discharge current which are attributable to the protruding portion. To do so, the protruding portion 21, which should fulfill the function of initiating discharge, is set to have a floating potential. In consideration of this, the present invention can be applied to the configuration shown in FIG. 11.

Figure 11:
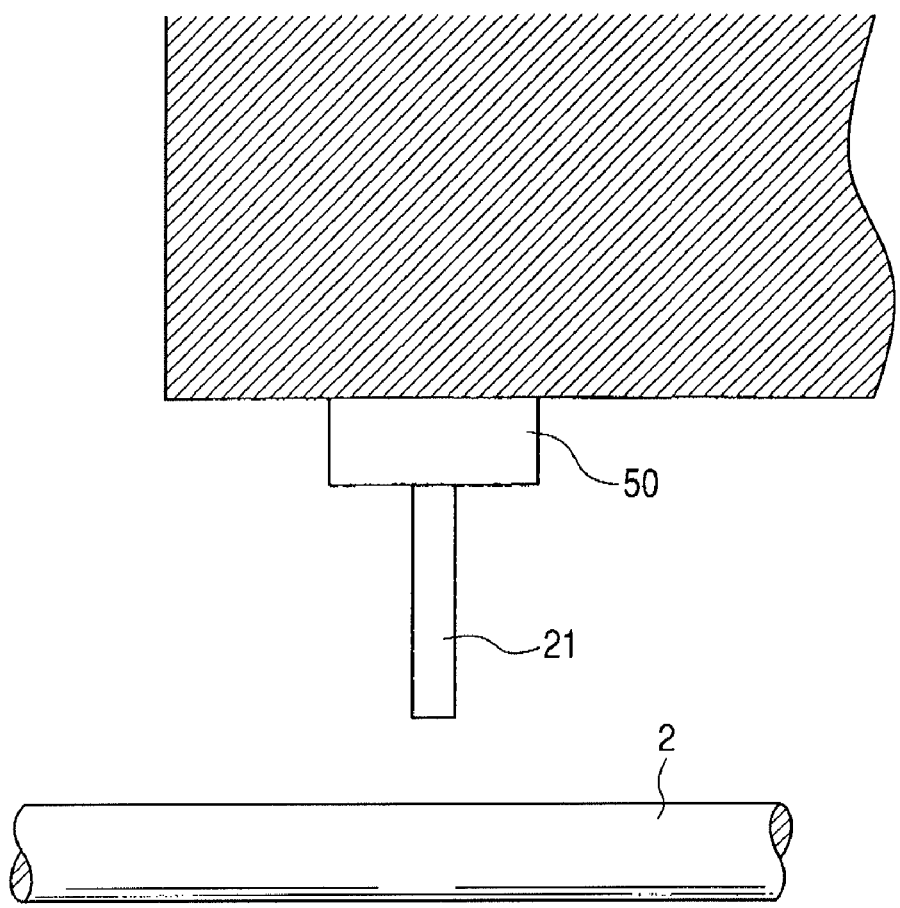
FIG. 11 is a view showing a modification of the cold cathode ionization vacuum gauge according to the present invention.

FIG. 11 is a view showing a cold cathode ionization vacuum gauge according to this embodiment. In FIG. 11, an insulating material 50 (for example, an insulating adhesive such as a polyimide adhesive or an alumina adhesive) is placed on the gauge head chamber 1 as the cathode. The protruding portion 21 is provided to the gauge head chamber (cathode) 1 with the insulating material 50 interposed in between so that the gauge head chamber 1 would be insulated from the protruding portion 21. The protruding portion 21 may be provided to the anode with the insulating material 50 interposed in between, or may be provided to both the cathode and anode if an insulating condition can be established with each of the electrodes.

In addition, in this embodiment, it is not necessary to provide the protruding portion 21 with the insulating material interposed between the protruding portion 21 and at least one of the anode and cathode. The protruding portion 21 may be placed anywhere inside the discharge space 9, as long as the potential of the protruding portion 21 is a floating potential (for example, the protruding portion 21 is insulated from an electric circuit formed of the anode 2, the gauge head chamber 1 as the cathode, and the vacuum gauge operation circuit 13, or some other configuration). Moreover, in the above embodiments, the descriptions have been given of the cold cathode ionization vacuum gauges each using a rod-shaped anode (or cathode) and a cylindrical cathode (or anode) provided to surround the rod-shaped anode (or cathode); however, the present invention is not limited to such configuration. The shapes and the placement positions of the anode and cathode provided to the cold cathode ionization vacuum gauge are not the features of the present invention. Thus, the anode and the cathode may take any shape and placement position as long as they can form a discharge space and function as a cold cathode ionization vacuum gauge.

What is claimed is:

1. A cold cathode ionization vacuum gauge comprising:
an anode;
a cathode placed in such a manner as to form a discharge space together with the anode; and
a member configured so that, in voltage application to the anode and the cathode, an electric field should be concentrated at the member to a larger extent than an electric field at the cathode is, wherein
the member is provided inside the discharge space in such a manner that the member has a floating potential.

2. The cold cathode ionization vacuum gauge according to claim 1, further comprising a support member to which the member is provided.

3. The cold cathode ionization vacuum gauge according to claim 2, wherein
the support member is connected to at least one of the anode and the cathode, and
the support member itself is an insulator, or at least a connecting portion between the support member and the member is insulative.

4. The cold cathode ionization vacuum gauge according to claim 3, wherein
one of the anode and the cathode is a rod-shaped electrode,
the other one of the anode and the cathode is a cylindrical electrode provided in such a manner as to surround the rod-shaped electrode,
the support member has a disk shape and has an opening,
the member is a protrusion extending from an edge of the opening toward the rod-shaped electrode,
the rod-shaped electrode is placed through the opening, and
the protrusion is provided to the disk-shaped support member while being insulated therefrom.

5. The cold cathode ionization vacuum gauge according to claim 4, wherein the disk-shaped support member is mounted in the discharge space by bringing an edge of an outer circumference of the disk-shaped support member into pressure contact with an inner wall of the cylindrical electrode.

6. The cold cathode ionization vacuum gauge according to claim 4, wherein
one protrusion is provided as the protrusion, and
a distance between a tip of the protrusion and the rod-shaped electrode is not smaller than 0.05 mm but not larger than 3.0 mm.

7. The cold cathode ionization vacuum gauge according to claim 4, wherein
one protrusion is provided as the protrusion, and
a thickness of the protrusion is not larger than 1 mm.

8. An auxiliary discharge starting electrode plate used in a cold cathode ionization vacuum gauge which includes: a rod-shaped electrode as one of an anode and a cathode; and a cylindrical electrode as the other one of the anode and the cathode, the cylindrical electrode being provided in such a manner as to surround the rod-shaped electrode, the auxiliary discharge starting electrode plate comprising:
an opening to allow penetration of the rod-shaped electrode;
a protrusion which is provided to the auxiliary discharge starting electrode plate while being insulated therefrom, and which projects in the opening; and
a support claw for attachment to the cylindrical electrode.

9. A vacuum processing apparatus comprising the cold cathode ionization vacuum gauge according to claim 1.

* * * * *